United States Patent Office 3,318,810
Patented May 9, 1967

3,318,810
PHOSPHOMOLYBDENUM DERIVATIVES AND THEIR LUBRICANT COMPOSITIONS
Joseph J. McGrath, Monroeville, and Harold O. Strange, Pittsburgh, Pa., assignors to Gulf Research & Development Company, Pittsburgh, Pa., a corporation of Delaware
No Drawing. Filed Nov. 4, 1965, Ser. No. 506,397
24 Claims. (Cl. 252—46.4)

This invention relates to novel phosphomolybdenum derivatives and more particularly to reaction products of phosphomolybdic acid and organic phosphites, which products impart antiwear and extreme pressure characteristics to lubricating oil compositions containing the same.

As is well known to those skilled in the art, uncompounded lubricating oils frequently fail to provide satisfactory lubrication to surfaces engaging under extreme pressure. The failure of lubricants to provide proper lubrication under high operating pressures results in the rubbing surfaces of machinery suffering considerable wear even to such an extent that they must be replaced.

This invention is based upon the discovery that certain novel reaction products of phosphomolybdic acid and hydrocarbyl substituted phosphites when blended in minor proportions with lubricating oils impart to the resulting composition significantly improved antiwear and extreme pressure characteristics. The exact nature of the complex reaction products herein described has not been definitely ascertained.

The new products which have been found particularly useful as addition agents in lubricating oils according to the invention are obtained by reacting phosphomolybdic acid with an organic phosphite represented by the general formula $(RX)_xP(XH)_y$ where R is a hydrocarbon radical selected from the group consisting of alkyl, aryl, alkaryl, aralkyl and cycloalkyl radicals; X is selected from the group consisting of oxygen and sulfur; $x$ is an integer from 1 to 3 inclusive; $y$ is an integer from 0 to 2 inclusive; and the sum of $x$ and $y$ is 3. Those organic phosphites in which the total number of carbon atoms in $(RX)_x$ is at least 6 and preferably more than 6 carbon atoms as for example from 6 to 36 carbon atoms or more are preferred since the longer carbon chains tend to increase the solubility of the resulting product in lubricating oils. When $x$ is either 2 or 3 the R substituents may be alike or different. From the standpoint of ease in preparation, it is preferred to employ those compounds where the R groups are of the same kind.

Specific examples of the radicals which we intend to include with respect to R in organic phosphites are as follows:

(I) Where R is alkyl: Methyl; ethyl; propyl; isopropyl; n-butyl; sec-butyl; tertiary butyl; amyl; hexyl; heptyl; n-octyl; isooctyl; nonyl; decyl; undecyl; dodecyl; tridecyl; tetradecyl; pentadecyl; hexadecyl; heptadecyl; octadecyl; and the like.

(II) Where R is aryl: Phenyl; 1-naphthyl; 2-naphthyl; and the like.

(III) Where R is alkaryl: o-, m- and p-tolyl; o-, m- and p-xylyl; methylnaphthyl; dimethylnaphthyl; tri-, tetra-, penta-, hexa- and heptamethylnaphthyl; o-, m- and p-ethylphenyl; o-, m- and p-propylphenyl; o-, m- and p-butylphenyl; o-, m- and p-amylphenyl; o-, m- and p-hexylphenyl; o-, m- and p-heptylphenyl; o- m- and p-octylphenyl; o-, m- and p-nonylphenyl; diethylphenyl; dipropyl-, dibutyl-, diamyl-, dihexyl-, diheptyl- and dioctylphenyl; trialkylphenyl; tetraalkylphenyl; pentaalkylphenyl; and the like.

(IV) Where R is aralkyl: Benzyl; phenethyl; gamma-phenylpropyl; naphthylethyl; o-, m- and p-methylbenzyl; o-, m- and p-methylphenethyl; and other alkylbenzyls; o-, m- and p-alkylnaphthylethyl; and the like.

(V) Where R is cycloalkyl: Cyclopentyl; cyclohexyl; cyclooctyl; alkylcycloalkyl; and the like.

Organic phosphites represented by the above general formula include primary $[ROP(OH)_2]$; secondary $[(RO)_2POH]$; and tertiary $[(RO)_3P]$ phosphites. Specific examples of the organic phosphites which may be employed in accordance with the present invention include hexyl phosphite; octyl phosphite; decyl phosphite; dodecyl phosphite; 2-ethylhexyl phosphite; octadecyl phosphite; phenyl phosphite; naphthyl phosphite; tolyl phosphite; ethylphenyl phosphite; octylphenyl phosphite; diethylphenyl phosphite; dipropyl-, dibutyl- and dioctylphenyl phosphite; benzyl phosphite; phenylethyl phosphite; cyclopentyl phosphite; cyclohexyl phosphite; dipropyl phosphite; dibutyl phosphite; dihexyl phosphite; dioctadecyl phosphite; diphenyl phosphite; ditolyl phosphite; dibenzyl phosphite; dicyclohexyl phosphite; triethyl phosphite; triisooctyl phosphite; tridodecyl phosphite; triphenyl phosphite; tritolyl phosphite; tribenzyl phosphite; tricyclohexyl phosphite; and the like. The corresponding thio-, dithio- and trithio- analogues of phosphites of the foregoing enumerated type may also be reacted in accordance herewith.

Specific examples of the thio-, dithio- and trithiophosphites which may be employed in accordance with the present invention include:

hexyl thiophosphite
octyl thiophosphite
decyl thiophosphite
dodecyl thiophosphite
2-ethylhexyl thiophosphite
octadecyl thiophosphite
phenyl thiophosphite
naphthyl thiophosphite
tolyl thiophosphite
ethylphenyl thiophosphite
octylphenyl thiophosphite
diethylphenyl thiophosphite
dioctylphenyl thiophosphite
benzyl thiophosphite
phenylethyl thiophosphite
cyclopentyl thiophosphite
cyclohexyl thiophosphite
dipropyl thiophosphite
dibutyl thiophosphite
dihexyl thiophosphite
dioctadecyl thiophosphite
diphenyl thiophosphite
ditolyl thiophosphite
dibenzyl thiophosphite
dicyclohexyl thiophosphite
triethyl thiophosphite
triisooctyl thiophosphite
tridodecyl thiophosphite
triphenyl thiophosphite
tritolyl thiophosphite
tribenzyl thiophosphite
tricyclohexyl thiophosphite
hexyl dithiophosphite
octyl dithiophosphite
decyl dithiophosphite
dodecyl dithiophosphite
2-ethylhexyl dithiophosphite
octadecyl dithiophosphite
phenyl dithiophosphite
naphthyl dithiophosphite
tolyl dithiophosphite ethylphenyl dithiophosphite
octylphenyl dithiophosphite
diethylphenyl dithiophosphite
dioctylphenyl dithiophosphite
benzyl dithiophosphite
phenylethyl dithiophosphite
cyclopentyl dithiophosphite
cyclohexyl dithiophosphite
dipropyl dithiophosphite
dibutyl dithiophosphite
dihexyl dithiophosphite
dioctadecyl dithiophosphite
diphenyl dithiophosphite
ditolyl dithiophosphite
dibenzyl dithiophosphite
dicyclohexyl dithiophosphite
triethyl dithiophosphite
triisooctyl dithiophosphite
tridodecyl dithiophosphite
triphenyl dithiophosphite
tritolyl dithiophosphite
tribenzyl dithiophosphite
tricyclohexyl dithiophosphite
hexyl trithiophosphite
octyl trithiophosphite
decyl trithiophosphite
dodecyl trithiophosphite
2-ethylhexyl trithiophosphite
octadecyl trithiophosphite
phenyl trithiophosphite
naphthyl trithiophosphite
tolyl trithiophosphite
ethylphenyl trithiophosphite
octylphenyl trithiophosphite
diethylphenyl trithiophosphite
dioctylphenyl trithiophosphite
benzyl trithiophosphite
phenylethyl trithiophosphite
cyclopentyl trithiophosphite
cyclohexyl trithiophosphite
dipropyl trithiophosphite
dibutyl trithiophosphite
dihexyl trithiophosphite
dioctadecyl trithiophosphite
diphenyl trithiophosphite
ditolyl trithiophosphite
dibenzyl trithiophosphite
dicyclohexyl trithiophosphite
triethyl trithiophosphite
triisooctyl trithiophosphite
tridodecyl trithiophosphite
triphenyl trithiophosphite
tritolyl trithiophosphite
tribenzyl trithiophosphite
tricyclohexyl trithiophosphite While all of the organic phosphites and thio-, dithio- and trithio-analogues designated hereinabove can be reacted with phosphomolybdic acid according to the present invention, it will be understood, of course, that the effectiveness of the resulting products as lubricating oil anti-wear and extreme pressure additives may vary. Especially good results are obtained with the trialkyl phosphites and trialkyl trithiophosphites wherein the alkyl groups contain from 8 to 12 carbon atoms, such as, for example, triisooctyl phosphite and tridodecyl trithiophosphite.

The organic phosphites and their thio-, dithio- and trithio-analogues are readily available from the reaction of phosphorus trichloride with one or more of the appropriate alcohols or thioalcohols. Accordingly, neither the compounds per se nor their method of preparation is a part of this invention. The reaction of the phosphorus trichloride with the appropriate alcohol or thioalcohol usually requires 3 moles of the alcohol or thioalcohol to one mole of phosphorus trichloride. The alcohols may be pure or mixtures thereof. When mixtures of alcohols are employed it will be recognized that the R groups in the general formula $(RX)_xP(XH)_y$ when $x$ is 2 or 3 may be unlike groups corresponding to the hydrocarbyl groups in the mixed alcohols. It is only essential that the total number of carbon atoms in $(RX)_x$ be at least 6 so as to impart oil solubility to the final phosphomolybdic acid-organic phosphite reaction product.

Phosphomolybdic acid which is also known as phospho-12-molybdic acid is strongly hydrophilic and highly soluble in water. It is commercially available so that neither phosphomolybdic acid nor its method of preparation constitutes any portion of the present invention. According to one method of preparation described by A. Linz, Industrial and Engineering Chemistry, Analytical Edition, vol. 15, page 459 (1943), one mole of molybdic oxide and one-twelfth mole of phosphoric acid (85%) are added to enough water to make a total volume of 1.5 liters. The mixture is boiled for six hours and then evaporated to a volume of about 100 cc. Upon cooling the concentrate to room temperature and allowing it to remain quiescent, yellow to orange crystals of phosphomolybdic acid are formed.

The phosphomolybdic acid-organic phosphite reaction product disclosed herein can be prepared in any convenient manner. The reaction of the phosphomolybdic acid and the organic phosphite occurs readily at temperatures in the range of about 80° to about 140° C. The reaction is preferably conducted at atmospheric pressure in the presence of a solvent under reflux conditions while simultaneously removing the water of hydration in the course of the reaction. The reaction is continued until no more water is removed. Completion of the reaction is also evidenced by the reaction mass turning a deep blue color. The reaction time may vary over a wide range depending upon the efficiency of the contacting means, but usually a reaction time of about one to about five hours is sufficient to effect substantially complete reaction. Quantities of the various reactants will vary over a wide range. In general, however, the molecular ratio of the phosphomolybdic acid to the organic phosphite is within the range of about 1:1 to about 1:10, respectively. The resulting products are generally viscous liquids, but may be solids, of varying oil solubility depending upon the amount and nature of the hydrocarbon substitution in the structure and nature of the base oil. In general, it is desirable that the hydrocarbyl substituted phosphite reactant contain a total of at least 6 carbon atoms in the hydrocarbyl substituents, preferably 6 to 36 carbon atoms to provide adequate oil solubility in the final reaction product.

The synthesis of the phosphomolybdic acid-organic phosphite reaction product of the invention will be more fully understood from the following specific illustrative examples.

EXAMPLE I

A mixture of 10.4 grams (0.005 mole) phospho-12-molybdic acid, 16.8 grams (0.045 mole) triisooctyl phosphite and 250 ml. benzene was refluxed at about 80° C. in a flask connected to a reflux condenser by means of a Dean-Stark trap until no additional water was collected in the trap. The refluxing was conducted over a period of about 5 hours. The dark blue solution thus obtained was filtered after which the benzene was removed by distillation under reduced pressure. The reaction product thus obtained was a viscous dark blue oil containing 21.3 percent by weight of molybdenum. The mole ratio of phosphomolybdic acid to triisooctyl phosphite was 1:9, respectively. The product was readily soluble in di-2-ethylhexyl azelate and slightly soluble in mineral oil.

EXAMPLE II

A mixture of 5.2 grams (0.0025 mole) phospho-12-molybdic acid, 15.9 grams (0.025 mole) trilauryl trithiophosphite and 250 ml. benzene was refluxed at about 80° C. in a flask connected to a reflux condenser by means of a Dean-Stark trap until no additional water was collected in the trap. The refluxing was conducted over a period of about 5 hours. The dark blue solution thus obtained was filtered after which the benzene was removed by distillation under reduced pressure. The reaction product thus obtained was a viscous dark blue oil containing 12.35 percent by weight of molybdenum. The mole ratio of phosphomolybdic acid to trilauryl trithiophosphite was 1:10, respectively. The product was readily soluble in di-2-ethylhexyl azelate and slightly soluble in mineral oil.

While the oil-solubility of the phosphomolybdic acid-organic phosphite reaction product is controlled to some extent by the total number of carbon atoms in $(RX)_x$ and also by the relative proportions of the phosphomolybdic acid and organic phosphite, the oil-solubility of the reaction product, particularly in mineral lubricating oils, can be increased by further reaction of the phosphomolybdic acid-organic phosphite reaction product with an aliphatic amine including mono- and di-amines in which the aliphatic radical is selected from the group consisting of alkyl, alkenyl and alkadienyl radicals containing from 8 to 24 carbon atoms. Exemplary of the mono-amines are n-octyl, t-octyl, n-decyl, t-decyl, n-dodecyl, sec-dodecyl, n-tetradecyl, n-hexadecyl, n-octadecyl, n-octadecenyl, n-octadecadienyl, t-octadecyl, n-eicosyl, n-docosyl and n-tetracosyl amines. Examplary of the aliphatic diamines are N-octyl, N-decyl, N-dodecyl, N-tetradecyl, N-octadecyl, N-octadecenyl, N-octadecadienyl, N-eicosyl, N-docosyl and N-tetracosyl amino-propylamines. While the aliphatic radical can have either a straight- or branched-chain structure, we prefer to use aliphatic amines having a highly branched structure. Secondary and tertiary alkyl groups are preferred. Particularly satisfactory amines are tertiary dodecyl amine and its homologues containing up to 24 carbon atoms. Mixtures of tertiary alkyl primary amines containing 12 to 24 carbon atoms are available commercially and constitute a preferred embodiment of our invention as solubilizers for the phosphomolybdic acid-organic phosphite reaction product in mineral lubricating oils.

When the phosphomolybdic acid-organic phosphite reaction product is further reacted with an aliphatic amine, the reaction can be conducted in any convenient manner under conditions similar to those used in reacting the phosphomolybdic acid with the organic phosphite. The reaction is preferably conducted at temperatures in the range of about 25° to about 140° C. The reaction is preferably conducted at atmospheric pressure in the presence of a solvent under reflux conditions. The reaction time may vary over a wide range, depending upon the efficiency of the contacting means, but usually a reaction time of about one to above five hours is sufficient to effect substantially complete reaction. Quantities of the various reactants will vary over a wide range. In general, however, the molecular ratio of the amine to the organic phosphite reactant is within the range of about 1:1 to about 3:1 amine to phosphite, respectively. The resulting product is a viscous liquid which is readily soluble in both mineral and synthetic oils.

The synthesis of a phosphomolybdic acid-organic phosphite-aliphatic amine reaction product of the invention will be more fully understood by reference to the following specific illustrative example.

EXAMPLE III

A mixture of 5.2 grams (0.0025 mole) phospho-12-molybdic acid, 15.9 grams (0.025 mole) trilauryl trithiophosphite and 250 ml. benzene was refluxed at about 80° C. in a flask connected to a reflux condenser by means of a Dean-Stark trap until no additional water was collected in the trap. The refluxing was conducted over a period of about 5 hours. A dark blue solution was thus obtained. To the dark blue solution was added 10.2 grams (0.025 mole) of a mixture of tertiary alkyl primary amines consisting principally of a mixture of tertiary octadecyl to tertiary tetracosyl amines having a molecular weight of 269 to 353, a specific gravity of 0.853 a neutralization equivalent of 344 and a flash point of 265° F. ("Primene JM-T" manufactured by Rohm & Haas Company). The solution was stirred under refluxing conditions for a period of about 1 hour. The dark blue-green solution thus obtained was filtered after which the benzene was removed by distillation under a reduced pressure. The reaction product thus obtained was a viscous blue-green oil containing 9.38 percent by weight of molybdenum. The mole ratio of phosphomolybdic acid to trilauryl trithiophosphite to tertiary alkyl amine was 1:10:10, respectively. The product was readily soluble in di-2-ethylhexyl azelate and in a mineral lubricating oil.

The novel phosphomolybdic acid-organic phosphite reaction products and amine derivatives thereof embraced by the invention are particularly useful as additives to lubricating oils to improve the antiwear and extreme pressure characteristics thereof. When employed for this purpose the amount of the additive employed in the lubricant may vary over wide limits depending upon the particular additive employed, the type of base oil in which the additive is incorporated and the severity of the conditions to which the ultimate composition is subjected. In general, the additives of the invention are employed in lubricating oil compositions in amounts ranging from about 0.05 to about 10 percent by weight of the oil. Good results are obtained with about 1 to about 5 percent by weight of the phosphomolybdic acid-organic phosphite product or its amine derivative. In any event, the additive of the invention is employed in an amount sufficient to improve the antiwear and extreme pressure characteristics of the oil to which the additive is added.

The lubricating oil to which the additives of the invention are added to form a lubricating composition having improved antiwear and extreme pressure characteristics can be any oil of lubricating viscosity such as refined or semirefined paraffinic, naphthenic or asphalt base oil. Hydrotreated mineral oils, because of their improved stability over untreated oils are especially preferred lubricating bases for preparing lubricants to be used under moderately elevated temperatures. When temperatures in the order of 400° F. and above are to be encountered, synthetic oils of lubricating viscosity form a preferred class of lubricating oil bases to which the additives embraced by the invention are added. Thus, synthetic lubricating oils such as polymerized olefins, organic esters such as di-2-ethylhexyl sebacate and di-2-ethylhexyl azelate and the like can also be used as the base oil to form a lubricating composition in accordance with the invention. If desired, a blend of oils of suitable viscosity can be employed instead of a single oil, by means of which any desired viscosity can be secured.

The lubricating composition of our invention can contain minor amounts of other agents normally added to lubricating oils for a specific purpose such as an antioxidant, a dispersant, a detergent, a pour point depressant, a thickener, a corrosion inhibitor, a viscosity index improver, an antifoamant, a rust inhibitor, a dye and the like. The lubricating composition can also contain oiliness and other extreme pressure agents to further enhance the wear characteristics when desired.

To prepare an improved lubricating composition the additives disclosed herein can be added to the lubricating oil base directly or in the form of an oil concentrate in an amount to give the desired concentration in the final lubricating composition. Slight heating of the mixture may be advantageously employed to facilitate blending of the additives in the composition.

To demonstrate the effectiveness of the phosphomolybdic acid-organic phosphite reaction product and its amine derivatives of the type described hereinabove, we have conducted comparative tests, the results of which are listed below, with a representative mineral lubricating oil and synthetic lubricating oil alone and with the same oils blended with various representative additives of the invention. These tests were conducted, for example, with a highly refined paraffinic mineral oil of SAE 10 grade and with a synthetic oil comprising an ester of an aliphatic dibasic acid, e.g., di-2-ethylhexyl azelate. In illustrating the improved antiwear and load-carrying characteristics, tests were made using (1) the precision four-ball wear test and (2) and the four-ball extreme pressure test.

*Precision four-ball wear test*

In conducting this test, a precision four-ball wear test machine was employed. In this machine, three steel balls are securely fastened in contact with each other in a horizontal plane in a cup. A fourth steel ball in a rotating spindle is placed so that it is entirely supported by the other three balls forming a pyramid. The test cup is placed on a stage which can move vertically to facilitate loading. The stage rests on a calibrated fulcrum so that specific weights may be applied to force the three balls in the cup to contact the rotating fourth ball at a predetermined pressure. The cup holding the three balls also contains the test lubricant at a level of 2 mm. above the stationary balls, thus assuring an adequate supply of lubricant at the contact points. A fixed oil temperature is maintained by a relay system connected to a thermocouple in the cup and a heater in the stage. The fourth ball can be rotated from a motor drive at 600, 1200 or 1800 r.p.m. Each test is run with new steel balls.

A test is run on a lubricant at a specific load, temperature, speed and time. Lubricating properties are evaluated from an examination of (1) the scars on the clean surfaces of the three stationary balls, the two maximum right angle diameters of each wear scar being measured to the closest 0.01 millimeter and averaged and (2) the load in kilograms at which seizure occurs. A more complete description of the machine and test method are given in the Naval Research Laboratory Report entitled "A Study of the Four Ball Wear Machine," by W. C. Clinton, NRL Report 3709, September 1950.

In illustrating the improved antiwear and load-carrying characteristics of compositions of the invention by the precision four ball wear test, the movable ball was rotated at 1800 r.p.m. for one hour while maintaining the test lubricant at 250° F. Separate one hour tests were conducted using new steel balls at loads of 10, 20, 30, 40 and 50 kilograms unless seizure was encountered. At the end of each test, wear scars were measured. The advantageous wear properties of the oil containing an additive of the invention as compared with the base oil are illustrated by the data set forth in Table I.

*Four-ball extreme pressure test*

In conducting this test, a test machine is employed which is similar to the four-ball wear test machine. Steel balls of the same size as used in the wear test are used in the extreme pressure test. The essential difference is that the four-ball extreme pressure machine is more sturdily constructed. The steel balls are arranged in a pyramid as in the above test. The speed of rotation and the amount of test lubricant is also the same. However, the four-ball extreme pressure test is conducted for a period of only one minute with the lubricant at room temperature. If the balls do not weld together, the test is repeated at an increased load of 20 kilograms. The test is repeated with new balls at increased incremental loads of 20 kilograms until welding of the balls occurs. If evidence of seizure is observed by tearing of the bearing metal, a notation is made of the pressure at which such seizure occurs. Frequently, however, welding occurs without prior indication of seizure. The advantageous extreme pressure properties of the oil containing an additive of the invention as compared with the base oil are illustrated by the data set forth in Table I.

TABLE I

| Composition, Percent By Weight [1] | A | B | C | D | E | F |
|---|---|---|---|---|---|---|
| Di-2-ethylhexyl azelate | 100 | 98.87 | 98.22 | 97.33 | | |
| SAE 10 Mineral Oil | | | | | 100 | 97.33 |
| Product of Example I | | 1.13 | | | | |
| Product of Example II | | | 1.78 | | | |
| Product of Example III | | | | 2.67 | | 2.67 |
| Four-Ball Wear Test—Wear Scar Diameter, mm.: | | | | | | |
| Load, kg.: | | | | | | |
| 10 | 0.51 | | | | 0.67 | |
| 20 | 0.85 | | | | 0.65 | |
| 30 | 1.1 | 0.65 | 0.64 | 0.50 | [2] 1.75 | 0.66 |
| 40 | [2] 1.7 | 0.70 | 0.73 | 0.55 | | 0.75 |
| 50 | | 0.78 | 0.80 | 0.62 | | 0.75 |
| Four-Ball Extreme Pressure Test: | | | | | | |
| Seizure, kg | [3] | [3] | [3] | 140 | 60 | 160 |
| Weld Point, kg | 100 | 220 | 220 | 160 | 100 | 200 |

[1] Additive blends contain 0.25% by weight molybdenum.
[2] Seizure.
[3] No definite seizure.

It is apparent from the data in Table I that a lubricating composition containing an additive in accordance with the invention has substantially improved antiwear and load-carrying characteristics as determined by the four-ball wear test and the four-ball extreme pressure test.

Although the invention has been described particularly with reference to lubricating oil compositions, it will be recognized that other lubricating compositions including oils thickened to the consistency of a grease are included by the invention.

While our invention has been described with reference to various specific examples and embodiments, it will be understood that the invention is not limited to such examples and embodiments and may be variously practiced within the scope of the claims hereinafter made.

We claim:
1. The product obtained by reacting at a temperature of about 80° to about 140° C. 1 mole of phosphomolybdic acid with about 1 to about 10 moles of an organic phosphite represented by the general formula

$$(RX)_x P(XH)_y$$

where R is a hydrocarbyl radical selected from the group consisting of alkyl, aryl, alkaryl, aralkyl and cycloalkyl radicals; X is selected from the group consisting of oxygen and sulfur; $x$ is an integer from 1 to 3; $y$ is an integer from 0 to 2; the sum of $x$ and $y$ is 3; and the total number of carbon atoms in $(RX)_x$ is at least 6.

2. The product of claim 1 wherein the organic phosphite is a trialkyl phosphite, the alkyl radical of which contains from 8 to 12 carbon atoms.

3. The product of claim 2 wherein the trialkyl phosphite is triisooctyl phosphite.

4. The product of claim 1 wherein the organic phosphite is a trialkyl trithiophosphite, the alkyl radical of which contains from 8 to 12 carbon atoms.

5. The product of claim 4 wherein the trialkyl trithiophosphite is trilauryl trithiophosphite.

6. The product obtained by reacting at a temperature of about 80° to about 140° C. 1 mole of phosphomolybdic acid with about 1 to about 10 moles of an organic phosphite represented by the general formula $$(RX)_x P(XH)_y$$

where R is a hydrocarbyl radical selected from the group consisting of alkyl, aryl, alkaryl, aralkyl and cycloalkyl radicals; X is selected from the group consisting of oxygen and sulfur; $x$ is an integer from 1 to 3; $y$ is an integer from 0 to 2; the sum of $x$ and $y$ is 3; and the total number of carbon atoms in $(RX)_x$ is at least 6; and thereafter reacting the phosphomolybdic acid-organic phosphite reaction product at a temperature of about 25° to about 140° C. with about 1 to about 30 moles of an aliphatic amine wherein the alphatic radical is a hydrocarbyl radical selected from the group consisting of alkyl, alkenyl and alkadienyl radicals containing 8 to 24 carbon atoms.

7. The product of claim 6 wherein the organic phosphite is a trialkyl phosphite, the alkyl radical of which contains from 8 to 12 carbon atoms.

8. The product of claim 7 wherein the trialkyl phosphite is triisooctyl phosphite and the aliphatic amine is a mixture of tertiary $C_{12}$ to $C_{24}$ alkyl primary amines.

9. The product of claim 7 wherein the trialkyl phosphite is triisooctyl phosphite and the aliphatic amine is a mixture of tertiary $C_{18}$ to $C_{24}$ alkyl primary amines.

10. The product of claim 6 wherein the organic phosphite is a trialkyl trithiophosphite, the alkyl radical of which contains from 8 to 12 carbon atoms.

11. The product of claim 10 wherein the trialkyl trithiophosphite is trilauryl trithiophosphite and the aliphatic amine is a mixture of tertiary $C_{12}$ to $C_{24}$ alkyl primary amines.

12. The product of claim 10 wherein the trialkyl trithiophosphite is trilauryl trithiophosphite and the aliphatic amine is a mixture of tertiary $C_{18}$ to $C_{24}$ alkyl primary amines.

13. A lubricating composition comprising a major amount of an oil of lubricating viscosity and a minor amount, sufficient to improve the antiwear and extreme pressure characteristics of the oil, of the product obtained by reacting at a temperature of about 80° to about 140° C. 1 mole of phosphomolybdic acid with about 1 to about 10 moles of an organic phosphite represented by the general formula $$(RX)_x P(XH)_y$$

where R is a hydrocarbyl radical selected from the group consisting of alkyl, aryl, alkaryl, aralkyl and cycloalkyl radicals; X is selected from the group consisting of oxygen and sulfur; $x$ is an integer from 1 to 3; $y$ is an integer from 0 to 2; the sum of $x$ and $y$ is 3; and the total number of carbon atoms in $(RX)_x$ is at least 6.

14. The lubricating composition of claim 13 wherein the organic phosphite is a trialkyl phosphite, the alkyl radical of which contains from 8 to 12 carbon atoms.

15. The lubricating composition of claim 14 wherein the trialkyl phosphite is triisooctyl phosphite.

16. The lubricating composition of claim 13 wherein the organic phosphite is a trialkyl trithiophosphite, the alkyl radical of which contains from 8 to 12 carbon atoms.

17. The lubricating composition of claim 16 wherein the trialkyl trithiophosphite is trilauryl trithiophosphite.

18. A lubricating composition comprising a major amount of an oil of lubricating viscosity and a minor amount, sufficient to improve the antiwear and extreme pressure characteristics of the oil, of the product obtained by reacting at a temperature of about 80° to about 140° C. 1 mole of phosphomolybdic acid with about 1 to about 10 moles of an organic phosphite represented by the general formula $$(RX)_x P(XH)_y$$

where R is a hydrocarbyl radical selected from the group consisting of alkyl, aryl, alkaryl, aralkyl and cycloalkyl radicals; X is selected from the group consisting of oxygen and sulfur; $x$ is an integer from 1 to 3; $y$ is an integer from 0 to 2; the sum of $x$ and $y$ is 3; and the total number of carbon atoms in $(RX)_x$ is at least 6; and thereafter reacting the phosphomolybdic acid-organic phosphite reacting product at a temperature of about 25° to about 140° C. with about 1 to about 30 moles of an aliphatic amine wherein the aliphatic radical is a hydrocarbyl radical selected from the group consisting of alkyl, alkenyl and alkadienyl radicals containing 8 to 24 carbon atoms.

19. The lubricating composition of claim 18 wherein the organic phosphite is a trialkyl phosphite, the alkyl radical of which contains from 8 to 12 carbon atoms.

20. The lubricating composition of claim 19 wherein the trialkyl phosphite is triisooctyl phosphite and the aliphatic amine is a mixture of tertiary $C_{12}$ to $C_{24}$ alkyl primary amines.

21. The lubricating composition of claim 19 wherein the trialkyl phosphite is triisooctyl phosphite and the aliphatic amine is a mixture of tertiary $C_{18}$ to $C_{24}$ alkyl primary amines.

22. The lubricating composition of claim 18 wherein the organic phosphite is a trialkyl trithiophosphite, the alkyl radical of which contains from 8 to 12 carbon atoms.

23. The lubricating composition of claim 22 wherein the trialkyl trithiophosphite is trilauryl trithiophosphite and the aliphatic amine is a mixture of tertiary $C_{12}$ to $C_{24}$ alkyl primary amines.

24. The lubricating composition of claim 22 wherein the trialkyl trithiophosphite is trialkyl trilauryl trithiophosphite and the aliphatic amine is a mixture of tertiary $C_{18}$ to $C_{24}$ alkyl primary amines.

References Cited by the Examiner

UNITED STATES PATENTS

| | | | |
|---|---|---|---|
| 2,758,089 | 8/1956 | Hoff et al. | 252—46.4 |
| 2,852,469 | 9/1958 | Hugel | 252—49.7 |
| 2,866,732 | 12/1958 | Hoff et al. | 252—46.4 |
| 3,050,538 | 8/1962 | Hugel | 252—46.4 |
| 3,093,669 | 6/1963 | De Young | 260—429 |
| 3,103,494 | 9/1963 | Spengler et al. | 260—429 |

DANIEL E. WYMAN, *Primary Examiner.*

L. G. XIARHOS, *Assistant Examiner.*